United States Patent
Hasselberg et al.

Patent Number: 5,665,043
Date of Patent: Sep. 9, 1997

[54] GODET FOR HEATING AND ADVANCING YARNS

[75] Inventors: Michael Hasselberg, Wetter; Andreas Nehler, Dortmund; Bernd Neumann, Radevormwald, all of Germany

[73] Assignee: Barmag AG, Remscheid, Germany

[21] Appl. No.: 552,502

[22] Filed: Nov. 9, 1995

[30] Foreign Application Priority Data

Nov. 10, 1994 [DE] Germany ............ 44 40 129.9
Dec. 14, 1994 [DE] Germany ............ 44 44 590.3
Mar. 29, 1995 [DE] Germany ............ 195 11 502.3
Mar. 29, 1995 [DE] Germany ............ 195 11 575.9

[51] Int. Cl.⁶ ........................................... B23P 15/00
[52] U.S. Cl. ........................ 492/10; 28/240; 219/211; 492/46
[58] Field of Search .................... 492/9, 10, 46, 492/16; 28/240; 219/211, 652, 674

[56] References Cited

U.S. PATENT DOCUMENTS

| | | |
|---|---|---|
| 3,412,229 | 11/1968 | Seegrave, Jr. . |
| 3,508,024 | 4/1970 | Cannon . |
| 3,581,060 | 5/1971 | Bauer et al. . |
| 3,583,687 | 6/1971 | Nakahara . |
| 3,619,539 | 11/1971 | Taylor . |
| 3,701,873 | 10/1972 | Bauer et al. . |
| 3,879,594 | 4/1975 | Shillito . |
| 5,254,070 | 10/1993 | Callhoff . |
| 5,421,070 | 6/1995 | Lenk . |

FOREIGN PATENT DOCUMENTS 36 21 397   6/1987   Germany .

*Primary Examiner*—Irene Cuda
*Attorney, Agent, or Firm*—Bell, Seltzer, Park & Gibson, P.A.

[57] ABSTRACT

A godet for heating and advancing yarns which includes a stationary support member and a rotatable member which includes a heatable godet jacket. The temperature of the godet jacket is measured by means of temperature sensors, the output signals of which are transmitted by induction from the rotatable member to the stationary member. The godet is provided with an electronic memory, which is connected with the temperature sensors and stores the data supplied by the temperature sensors. The memory is connectible to a data transmission unit, and the data are transmitted by induction between a stationary primary coil and a rotating secondary coil, which also provides the supply of voltage to the rotating member. In this conjunction, it is possible to transmit the data both from the rotating member to the stationary member of the godet and from the stationary member to the rotating member.

19 Claims, 3 Drawing Sheets

GODET FOR HEATING AND ADVANCING YARNS

BACKGROUND OF THE INVENTION

The present invention relates to a heated godet for heating and advancing yarns, of the type comprising a stationary support member, and a rotatable member which includes a drive shaft and a tubular jacket mounted coaxially about the drive shaft.

During the production of a yarn, in particular a synthetic filament yarn, the yarn is guided over a heated godet and is advanced thereby. For a uniform quality of the yarn, it is necessary to keep the godet at a constant temperature. DE 36 21 397 discloses a godet of the described type, and wherein the temperature of the godet jacket is determined by means of one temperature sensor or several temperature sensors on the godet jacket. The temperature distribution in the axial direction of the godet is transmitted by means of a noncontacting inquiry of the measured data to an electronic control unit. The entire sequence of data inquiry, calibration, inquiry frequency, activation of the measuring sensors, and the like is predetermined permanently by the circuit. Errors, faulty controls and the like can be detected only momentarily.

It is an object of the present invention to further develop the known godet for heating and advancing synthetic filament yarns, such that the temperature measuring operation can be adapted to different requirements. A further object is to detect also temporarily occurring deviations from the desired operation and to store the same for a later inquiry. A further object is to simplify the diagnostics on the godet.

SUMMARY OF THE INVENTION

The above and other objects and advantages of the present invention are achieved by the provision of a godet which comprises a stationary support member, and a rotatable member rotatably mounted to the stationary support member and including a tubular jacket having an outer surface upon which the yarn is adapted to run. The jacket mounts a heating means, and at least one sensor is mounted to the rotatable member for sensing the temperature of the jacket and producing an output signal indicate thereof. Data transmission means is provided for transmitting by induction the output signal from the one sensor to an external control unit, and an electronic memory is mounted to one of the stationary support member and the rotatable member. The memory is electrically connected to the temperature sensor such that the memory can store at least a portion of the output signal from the sensor to the control unit.

Dependent on the yarn to be produced, the production process, and/or the range of application of a godet within the production process, a godet of the described type has to be adapted to a specific task. The use of the godet in accordance with the invention simplifies its production, since it is possible to define or program the specific functions of the godet after production, when same is delivered or assembled, and to store the data in the memory. The memory may also be used to make changes of the specific functions on site, so that within the scope of certain limits it is not necessary to exchange the godets.

The use of a memory in the godet, in particular in its rotating portion, allows calibration values for different ambient temperatures to be stored. To this end, for example in a test operation, the temperature on the outer jacket of the godet is measured with an external temperature sensor. From the comparison of the internal and external temperatures, the calibration value is obtained. In the memory, it is possible to store not only calibration values for different ambient temperatures, but also values for different load conditions. This enables a projection of the temperature on the outer godet jacket from internal measuring data under different load situations. This is especially important for increasing requirements with respect to the yarn quality.

The memory may also be used to register temporary malfunctions within the godet. Such malfunctions may be changes in voltage and current conditions, which are caused, for example, by loose contacts, temperature sensor breakages, or short circuits. The occurring malfunctions within a godet may be caused not only by the temperature sensors, but also by the commonly used electric heaters.

The memory may also be used to identify and observe a godet. This has the advantage that the behavior of the godet during the operation may be stored over longer periods of time, and that these operational values may then be evaluated as empirical values for the construction of further godets.

The memory may be inquired at random or predetermined time intervals. This possibility of inquiry has the advantage that no data receiver need be ready for permanent reception.

The arrangement of the memory on a rotating component has the advantage that the memory can be linked to and supplied by the electronic system that is integrated in the godet. Thus, the stored data remains always with the godet unit. The stationary electronic system could also be accommodated with a control unit in a control cabinet.

In accordance with an advantageous further development, it is proposed to arrange the memory on the drive shaft of the godet, preferably such that the memory is positioned symmetrically with respect to the longitudinal axis of the drive shaft. This allows the uneven centrifugal forces caused by the memory to be reduced, so as to make a balancing of the godet unnecessary. The arrangement of the memory on the drive shaft has also the advantage that the memory is relatively far removed from the hot godet jacket. The memory may be positioned also on the drive shaft outside of the godet jacket, thereby minimizing the thermal load of the memory. This arrangement has also the advantage that the memory is located essentially outside of the electromagnetic fields of an electric heater. This permits the possibility of an operational malfunction of the memory by strong electromagnetic fields to be minimized, by shielding the memory against the electromagnetic fields.

Instead of arranging the memory on the drive shaft, it is alternatively proposed that it may be mounted on the godet jacket. This arrangement takes into account that the godet jacket is exchangeable relative to the stationary portion of the godet, and that the characteristics, in particular the temperature transmitting characteristics of a godet jacket, change in the course of the operation by contamination and/or wear. However, it should also be considered that, despite the total identity of several processing stations, the heating effect of the godets may be quite different at the processing stations, not only as a result of the different conditions of wear and soiling on the godets, but also due to different losses in heat caused by an air flow. A memory that is exchangeable along with the godet jacket contains all these data.

The invention is especially advantageous for so-called multi-zone godets, which have heating zones that can be controlled independently of each other, with at least one temperature sensor being associated to each heating zone. In this instance, it is possible to predetermine, individually and as a function of the respective individual requirements, in particular the inquiry cycle and inquiry frequency in the individual zones by a programming on each godet.

In accordance with a further, advantageous aspect of the present invention, it is proposed to connect the memory to an electronic microprocessor for the inquiry and or supply of data. The microprocessor is a part of a data transmission unit that is connected to the godet.

It is preferred that the data transmission unit be noncontacting. In this instance, the transmission of data from the memory can also occur during the operation of the godet. Advantageously, the transmission of data from a rotating to a stationary component may occur with the use of a stationary primary coil and a rotating secondary coil. This arrangement enables a transmission of the data as voltage pulses in serial and digital form.

An advantageous further aspect of the present invention comprises the use of a data transmission unit which serves to transmit the supply energy for the temperature sensors, and wherein the voltage pulses of the data signals are superimposed over the voltage pulses of the supply energy. Thus only one transmitter, which transmits both the energy and the data, needs to be arranged between the rotating components and the stationary components of the godet. In this instance, the voltage pulses of the data signals are superimposed over the supply energy, so that a clear association of the data signal exists, and disturbing influences from the supply energy are eliminated.

In accordance with the invention, it is possible to transmit all data on the inductive path of the energy supply, which is formed by a stationary primary coil and a rotating secondary coil. This enables a constant transfer of data from the temperature sensor or the measuring sequence to the control unit. The provision of only one transmitter in the godet unit results in a low susceptibility to malfunction and, thus, in a reliable operation. Temporarily occurring deviations can be transmitted directly to the control unit and be controlled accordingly.

Advantageously the digital data are transmitted as a sequence of voltage pulses. The voltage pulses may be generated directly in the secondary circuit of the voltage supply, in that simply an additional load, for example, a resistor with a predetermined frequency, is interposed in the circuit.

The significance of the respective pulse depends on the particular shape of the pulses. A further advantageous possibility of coding the binary content of the data lies in the variation of the number of pulses occurring in each predetermined cycle. This form of data transmission allows to eliminate disturbing influences, which can affect the accuracy of the transmission. In the coding of the data, it has been found that in particular the modulation of the pulse duration is advantageous. Since the height of amplitude of the transmission frequency is not important in this instance, it is thus possible to prevent further disturbing influences.

As a result of superimposing the voltage pulses, and since the transmission frequency, which is, for example, 10 kHz, differs from the primary frequency, which is, for example 80 kHz, it is possible to decode the transmitted data flow, irrespective of the distance, by a specially combined filter circuit with a comparator.

In accordance with the invention, digital data of any kind can also be transmitted from the stationary component to the rotating component of the godet unit, the data transmission occurring by frequency modulation. In this instance, the data transmission and the energy supply may occur with one transmitter. The primary frequency of the energy supply is varied between two values, and a digital value is associated to each of the two frequencies. Since the amplitude of the frequency is irrelevant, fluctuations of the amplitude are of no importance during the transmission of data.

The special advantage of this godet unit lies in that it enables a controlled influence by the control unit on the measuring sequence. Furthermore, it is possible, for example, after an exchange of the godet jacket, to input new calibration data and/or process data in the rotating memory. In addition, it is possible to preset new inquiry programs or figures during the operation.

For identifying the frequencies, at which data are transmitted, at least one frequency recognition unit is provided. Advantageously, same may be designed and constructed in the form of an electronic microprocessor, which recognizes the frequency based on a measurement of the current or voltage, and which decodes the data. The frequency, at which the data are transmitted, may be varied, for example, between 40 and 80 kHz. Suitably, the one primary frequency is half as much as the other primary frequency. This frequency may be realized by a frequency divider.

BRIEF DESCRIPTION OF THE DRAWINGS

Further advantages and characteristics of the invention are described with reference to an embodiment illustrated in the drawing, in which.

DETAILED DESCRIPTION OF THE PREFERRED EMBODIMENT

Figure 1:
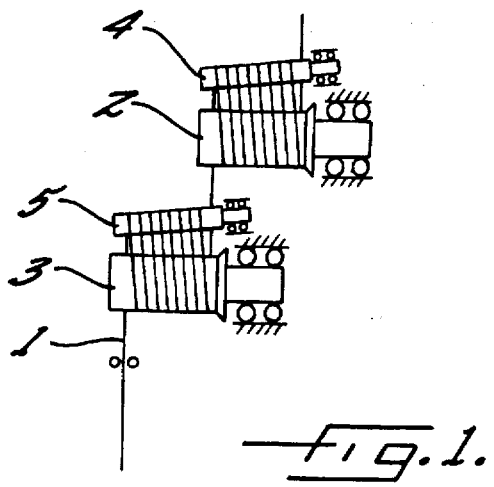
FIG. 1 is a schematic view of a path of a yarn over two godets.

Shown in FIG. 1 is a path of a yarn 1, which is advanced and heated by two heated godets 2 and 3. In so doing, the yarn loops about each godet 2 and 3 in several winds, and it is guided within each wind by a guide roll 4, 5 which is arranged axially inclined relative to the godet.

Figure 2:
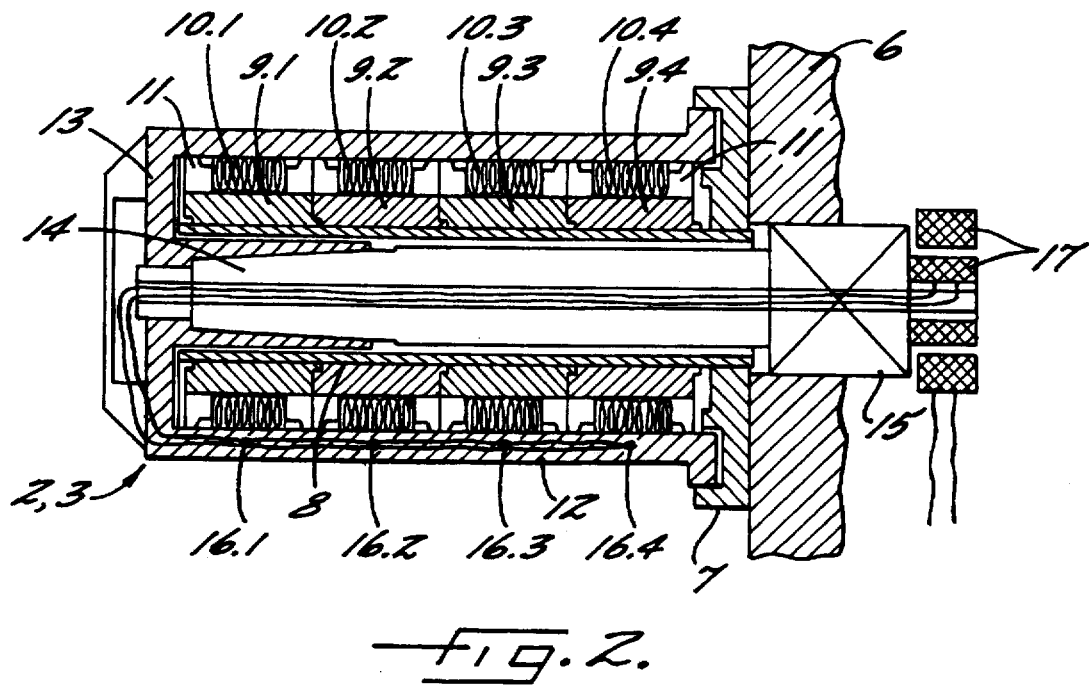
FIG. 2 is an axial sectional view of a godet unit.

Shown in FIG. 2 is an enlarged axial sectional view of a godet unit 2 or 3. The godet unit 2 consists of stationary and rotating components. The stationary components include a housing 6 that it fixedly connected with a machine frame (not shown).

Arranged on housing 6 is a disk-shaped holder 7. A sleeve 8 extends through the center of holder 7. Lined up along sleeve 8 are several, in the present embodiment four, lamellar supports 9.1, 9.2, 9.3, 9.4. The lamellar supports consist of a plurality of thin sheet metal plates, each being arranged in an axial plane of sleeve 8. Fixedly mounted on lamellar supports 9.1 . . . 9.4 are induction coils 10.1–10.4. Consequently, four pairs of lamellar supports and induction coils are arranged on sleeve 8. For a radial magnetic flux in godet jacket 12, lateral spacers 11 are provided, which are arranged between adjacent coils. The induction coils 10.1–10.4 can be supplied with a current of a predetermined frequency, and each can be controlled individually.

The rotating components include godet jacket 12, which is fixed on the front end of a drive shaft 14. As can be noted from the illustration in FIG. 2, the godet jacket 12 is connected with drive shaft 14 in form-locking or frictional engagement. The drive shaft 14 extends concentrically within the sleeve 8, and it is rotatably driven by a stationary motor 15 which is installed in housing 6.

The godet jacket 12 accommodates several temperature measuring sensors 16.1–16.4, one measuring sensor 16 being provided for each induction coil 10. Each temperature sensor is arranged in godet jacket 12 above its associated induction coil. The output signals of the temperature sensors 16.1–16.4 are amplified and converted into a digital signal. These digital signals are coded in a sequence of voltage pulses and transmitted stationarily by an inductive measured data transmitter 17, and they are converted in a display unit into an analogous, readable signal, or however, they are used to control induction coils 10.1 or 10.2 or 10.3 or 10.4. In this manner, the temperature measured on the individual sensors 16.1–16.4 is controlled to a desired value.

Figure 3:
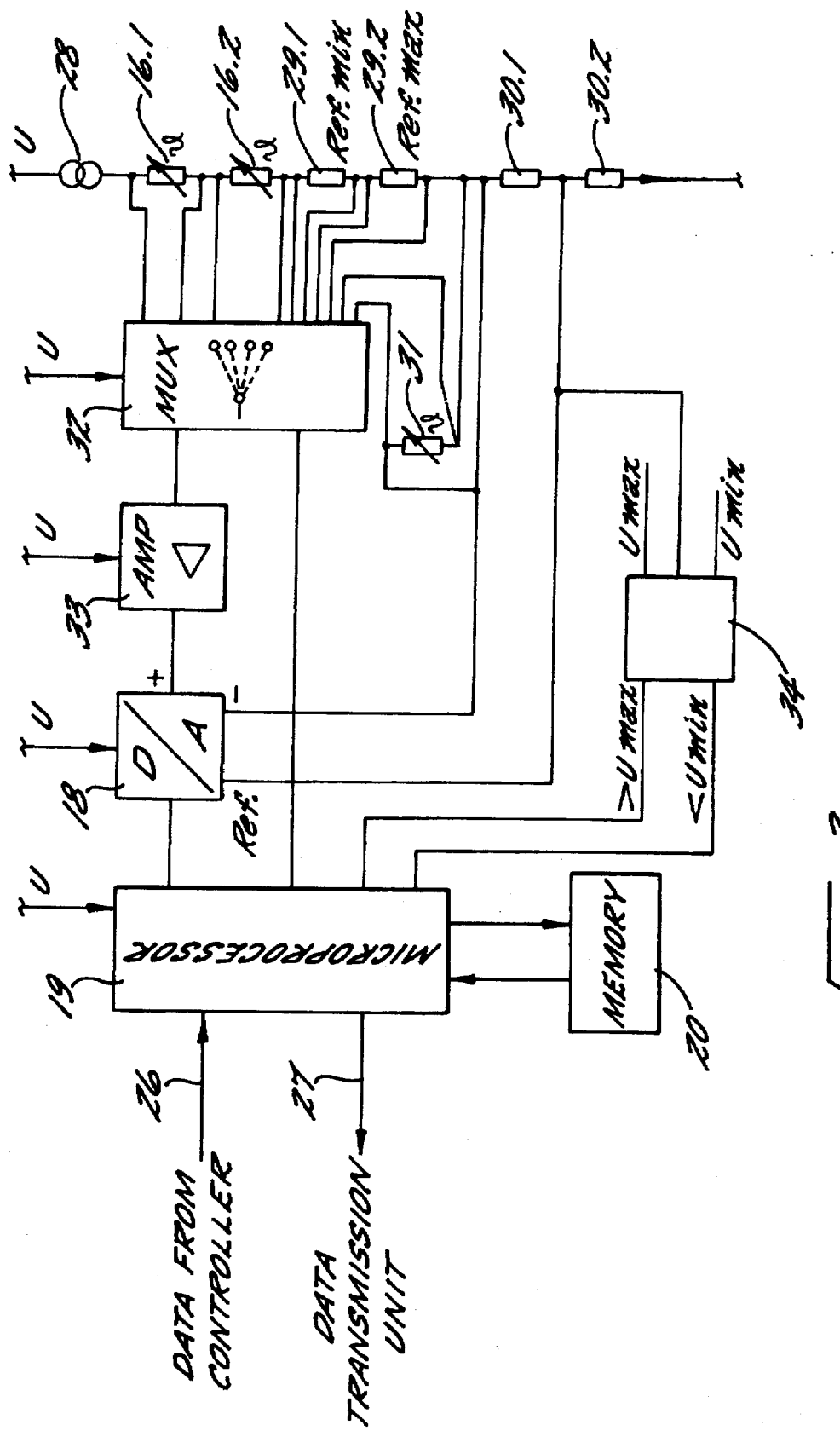
FIG. 3 shows the circuitry in the rotating component of the godet unit.

FIG. 3 illustrates the circuitry in the rotating component of the godet unit. In this circuit arrangement, the measuring sequence with temperature sensors 16.1 and 16.2 as well as fixed-value resistors 29 and 30 are energized by a source of current 28. The fixed-value resistors 29.1 and 29.2 define the measuring range. As an output signal of the temperature sensors 16.1 and 16.2 the voltage drop is measured and supplied to a multiplexer 32. From the multiplexer, the signals are supplied via an amplifier 33 to an analog-digital converter 18. For a zero shift, the analog-digital converter receives a signal from fixed-value resistors 30.1 and 30.2. In the analog-digital converter, the analog measuring signals are converted to digital values and supplied to microprocessor 19. The microprocessor 19 is connected with an electronic memory 20, so that the data can be stored in the memory. However, the microprocessor 19 can also retrieve data stored in the memory 20, such as, for example, calibration values, inquiry programs, and process data. Via a line 27, the microprocessor 19 supplies the data to a data transmission unit. In this connection, the microprocessor 19 functions as a data input unit and a data output unit for memory 20. The data from a controller (not shown) enter, via a line 26, into the microprocessor 19, and from there into memory 20.

The memory 20 is mounted on the drive shaft or in a suitable location on the godet jacket, and rotates along therewith. The memory is addressable, nontransient, writable, and readable, and it can be accessed from both the rotating component of the godet and from the stationary control unit. The memory is designed such as to permit the storage of programs, process data, and fixed values.

Considered are, for example, calibration data. In this connection, it ought to be taken into account that the temperature sensing occurs in the interior of the godet jacket, whereas it is the temperature on the outer jacket of the godet that is of concern. Thus, it would be possible to measure the real temperature on the outside of the jacket surface, for example, by means of a pyrometer, and the temperature in the interior of the godet jacket that is sensed by the temperature sensor could be compared therewith and converted to the real value. This correlation of measured value and actual outside value could be stored as a characteristic. Likewise, it would be possible to store and to recall later signalled errors, such as, for example, "sensor open," "sensor short-circuited," "excess temperature," and "inside temperature." Likewise, it would be possible to input in the memory programs such as, for example, inquiry cycles.

The positioning of the memory in the stationary component of the godet is also possible. The system-specific data, which remain in existence during a change or a repair of the godet jacket, could be stored in a memory, which remains in the stationary portion of the godet, thereby permitting an identification of the godet at any time.

A temperature sensor 31 as shown in FIG. 3 measures the inside temperature of the circuit. This ensures that the circuit operates always in an optimal range. In the event of temperature fluctuations in the circuit, it would however be also possible to input previously determined correction values in the individual electronic components.

A comparator 34 detects, whether the current flow through the measuring sequence is within its predetermined range. Its signal is supplied to microprocessor 19.

Figure 4:
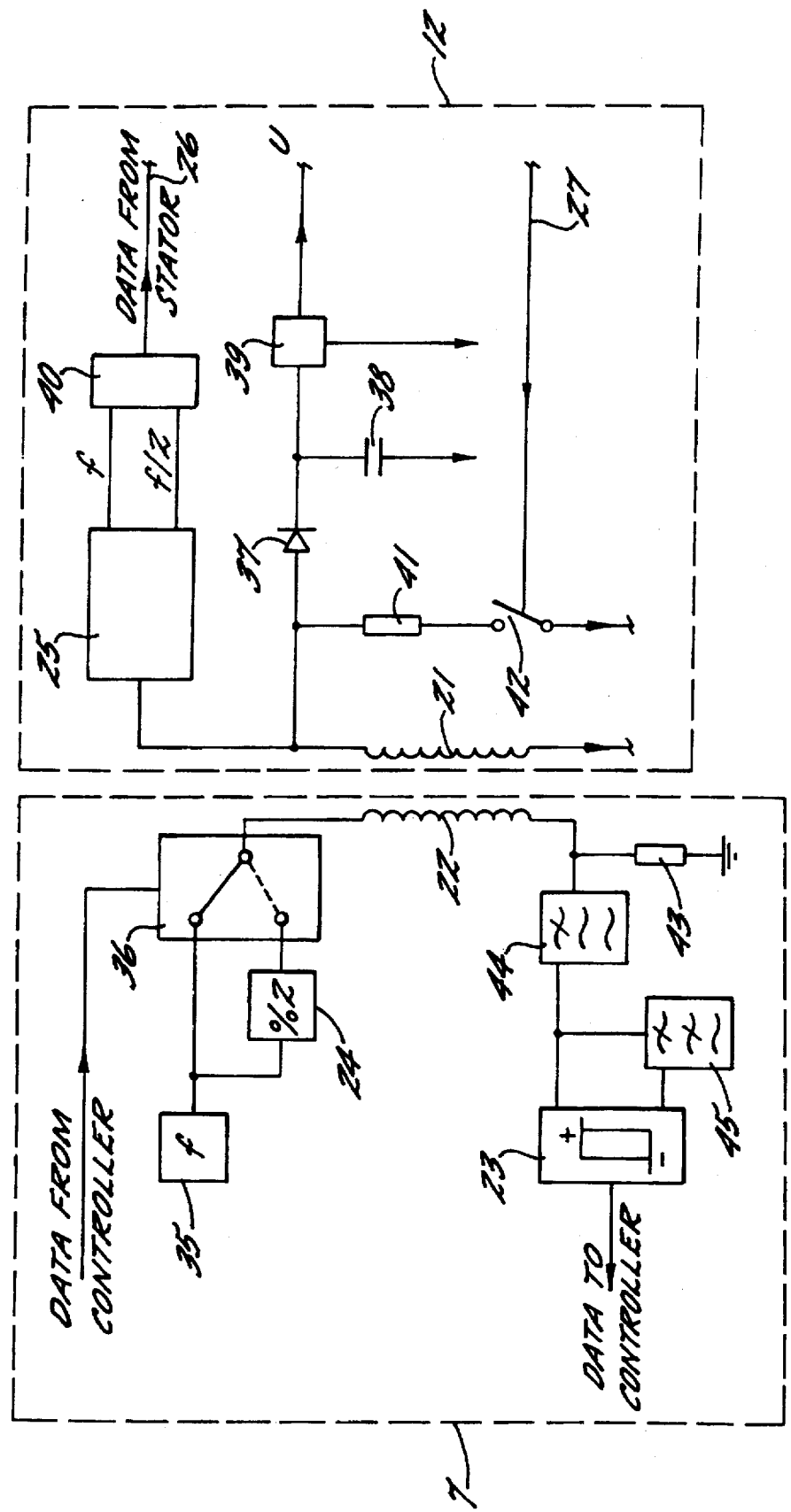
FIG. 4 is a schematic view of a circuitry for a data transmission between the stationary component and the rotating component of a godet unit.

The circuit diagram of FIG. 4 illustrates the inductive supply of power to the measuring sequence as well as the therein contained data transmission unit. In this arrangement, a primary coil 22 with its associated circuit is mounted on holder 7. A secondary coil 21 with its associated circuit is mounted on godet jacket 12. To supply voltage, primary coil 22 receives in rectangular shape alternating current at a frequency of, for example, 80 kHz, that is predetermined by a frequency changer 35. The voltage induced in secondary coil 21 is rectified via a diode 37 and a rectifier 38, and it is fed via a voltage regulator 39 to supply the measuring sequence.

The data transmission unit provides that the data line 27 proceeding from microprocessor 19 (note FIG. 3) leads to a switch 42. The switch 42 opens and closes as a function of the data signal, so that a voltage pulse is generated as a result of additional load 41 when the switch is closed. Thus, a sequence of voltage pulses is formed, which is supplied at a transmission frequency determined by microprocessor 19 by means of secondary coil 21 and transmitted to primary coil 22. The binary content of the data can be coded by the shape of the generated pulses or by the number of pulses for each predetermined cycle. In this connection, a cycle is selected with a constant time, which is independent of the transmission frequency. The shape of the voltage pulses may be modulated by the pulse duration or the pulse height. The binary content of each pulse (0 or 1) can thus be determined either from the pulse width, the pulse height, the number of pulses per cycle, or from the spacing of the pulses per cycle. This digital form of the transmission allows to eliminate disturbing influences which could affect the accuracy of the transmission. The transmission voltage overlies the primary voltage by induction. The transmission frequency is, for example, 10 kHz. To recover the transmission signal, primary current fluctuations are supplied to measuring resistor 43. The thus-generated voltage pulses are supplied to a filter 44. The filter 44 filters out the high primary frequency, for example, 80 kHz. The filtered signal is supplied to a second filter 45, which smooths the low frequencies. Both signals are supplied to comparator 23, which decodes the transmitted signals and supplies same to a control unit.

The transmission of data from the control unit (stationary component) to memory 20 (rotating component) or to microprocessor 19 occurs such that the digital signals are supplied to a changeover switch 36. By means of changeover switch 36 the primary frequency is varied between two specific values. In this connection, it has been found advantageous that the second value of the primary frequency is exactly half the primary frequency. Thus, for example, the primary frequency could vary between 80 kHz and 40 kHz. Subsequently, a digital value is associated to each of the two frequencies. Thus, primary coil 22 receives an alternating current of different frequencies. The induced voltage pulses in the secondary coil are supplied to a frequency recognition unit 25, which associates a digital value to the respective frequency. Instead of measuring the voltage, the frequency recognition unit can identify the frequency of means of a current measurement. A further possibility consists of counting the pulses per unit time. Converter 40 converts the serial digital values into parallel data, and supplies same to the microprocessor, or directly to memory 20. The frequency recognition may also be performed directly by microprocessor 19.

In the drawings and the specification, there has been set forth preferred embodiments of the invention, and, although specific terms are employed, the terms are used in a generic and descriptive sense only and not for the purpose of limitation,.the scope of the invention being set forth in the following claims.

That which is claimed is:

1. A godet for heating and advancing a yarn and comprising:

a stationary support member, a rotatable member rotatably mounted to said stationary support member and including a tubular jacket having an outer surface upon which the yarn is adapted to run, means for heating the jacket, at least one sensor mounted to said rotatable member for sensing the temperature of said jacket and producing an output signal indicative thereof, data transmission means for transmitting by induction the output signal from said one sensor to an external control unit, and an electronic memory mounted to one of said stationary support member and said rotatable member, with said memory being electrically connected to said temperature sensor such that the memory can store at least a portion of the output signal from the sensor to the control unit.

2. The godet as defined in claim 1, wherein the memory is mounted to said rotatable member.

3. The godet as defined in claim 2, wherein said rotatable member further includes a drive shaft which is coaxially within said jacket, and wherein said memory is positioned on said drive shaft.

4. The godet as defined in claim 3, wherein said memory is positioned on the longitudinal axis of the drive shaft and outside the longitudinal length of said jacket.

5. The godet as defined in claim 2, wherein said memory is mounted to said jacket.

6. The godet as defined in claim 1, wherein said heating means comprises a plurality of induction coils which are serially arranged along the length of the godet, and wherein a like member of said sensors are provided, with the induction coils being independently controllable and associated each to a temperature sensor, and wherein the memory includes an inquiry program which may be used to predetermine the time cycle and frequency of the temperature inquiry from the individual temperature sensors.

7. The godet as defined in claim 1 further comprising an electronic microprocessor for inputting and outputting data to and from said memory.

8. The godet as defined in claim 7, wherein both the electronic microprocessor and the memory are mounted to said rotatable member.

9. The godet as defined in claim 7, wherein both the electronic microprocessor and the memory are mounted to said stationary support member.

10. The godet as defined in claim 7, wherein the data are transmitted between memory or microprocessor and the external control unit by a data transmitter which comprises a stationary primary coil and a secondary coil that is concentric with primary coil and rotates, the data being inductively transmitted in digital form as voltage pulses.

11. The godet as defined in claim 10, wherein the data transmitter serves to transmit the supply energy for the temperature sensor, and that the voltage pulses of the data signals are superimposed over the voltage pulses of the supply energy.

12. The godet as defined in claim 10, wherein the data transmitter serves to transmit the supply energy for the temperature sensor, and that the data are transmitted by frequency modulation.

13. A godet for heating and advancing a yarn and comprising:

a stationary support member, a rotatable member rotatably mounted to said stationary support member and including a tubular jacket having an outer surface upon which the yarn is adapted to run, means for heating the jacket, at least one sensor mounted to said rotatable member for sensing the temperature of said jacket and producing an output signal indicative thereof, and data transmission means for transmitting by induction the output signal from said one sensor to an external control unit, and including a primary coil and a secondary coil, and wherein the primary coil and the secondary coil transmit the supply energy for the one temperature sensor and the measuring sequence, and that the voltage pulses of the data signals are superimposed over the voltage pulses of the supply energy.

14. The godet as defined in claim 13, wherein the binary content of the data signals is coded by the number and/or the shape of the voltage pulses that occur during a predetermined cycle.

15. The godet as defined in claim 14, wherein the shape of the voltage pulses is varied by means of the pulse duration and/or the pulse height.

16. The godet as defined in claim 13, wherein the data flow is decoded on the primary side, in that by means of a filter the primary frequency is first filtered out of the data flow, and wherein the signal is supplied directly and after a second filtration to a comparator.

17. A godet for heating and advancing a yarn and comprising:

a stationary support member, a rotatable member rotatably mounted to said stationary support member and including a tubular jacket having an outer surface upon which the yarn is adapted to run, means for heating the jacket, at least one sensor mounted to said rotatable member for sensing the temperature of said jacket and producing an output signal indicative thereof, and data transmission means for transmitting by induction the output signal from said one sensor to an external control unit, and including a primary coil and a secondary coil, and wherein the primary coil and the secondary coil transmit the supply energy for the one temperature sensor and for the measuring sequence and the data signals from the control unit, the data being transmitted by frequency modulation.

18. The godet as defined in claim 17, wherein the data transmission means transmits digital data from the stationary component to the rotating component, the primary frequency of the supply energy being varied and a digital value being associated to each of the two frequencies and supplied via a frequency recognition unit for decoding the data flow on the secondary side.

19. The godet as defined in claim 18, wherein the frequency recognition unit is an electronic microprocessor, in which the frequency is identified by a current measurement or voltage measurement and converted into digital values.

* * * * *